US010235636B2

(12) United States Patent
Yamada et al.

(10) Patent No.: US 10,235,636 B2
(45) Date of Patent: Mar. 19, 2019

(54) FEATURE SELECTION

(71) Applicant: Excalibur IP, LLC, New York, NY (US)

(72) Inventors: Makoto Yamada, San Jose, CA (US); Hua Ouyang, Sunnyvale, CA (US); Yi Chang, Sunnyvale, CA (US); Avishek Saha, Sunnyvale, CA (US)

(73) Assignee: Excalibur IP, LLC, New York, NY (US)

( * ) Notice: Subject to any disclaimer, the term of this patent is extended or adjusted under 35 U.S.C. 154(b) by 796 days.

(21) Appl. No.: 14/516,471

(22) Filed: Oct. 16, 2014

(65) Prior Publication Data

US 2016/0110656 A1 Apr. 21, 2016

(51) Int. Cl.
*G06N 99/00* (2010.01)
*G06N 5/00* (2006.01)

(52) U.S. Cl.
CPC ........... *G06N 99/005* (2013.01); *G06N 5/003* (2013.01)

(58) Field of Classification Search
CPC .................................................. G06N 99/005
USPC ......................................................... 706/45
See application file for complete search history.

(56) References Cited

U.S. PATENT DOCUMENTS

2014/0207714 A1\* 7/2014 He ................... G06N 99/005
706/12

OTHER PUBLICATIONS

M. Yamada, W. Jitkrittum, L. Sigal, E. P. Xing, and M. Sugiyama, High-dimensional feature selection by featurewise kernelized LASSO, Neural Computation, vol. 26, pp. 185-207, 2014.*
Bach, Francis, Exploring Large Feature Spaces with Hierarchical Multiple Kernal Learning (NIPS), 2008.
Balasubramanian, Krishnakumar; Sriperumbudur, Bharath; and Lebanon, Guy, "Ultrahigh Dimensional Feature Screening via RKHS Embeddings", 16th International Conference on Artificial Intelligence and Statistics 2013, vol. 31 of JMLR: W&CP 31 (2013).
Cortes, Corinna; Mohri, Mehryar; and Rostamizadeh, Afshin, "Algorithms for learning Kernals Based on Centered Alignment", *Journal of Machine Learning Research* 13 (2012), 795-828.
Danziger, Samuel; Baronio, Roberta; Ho, Lydia; Hall, Linda; Salmon, Kirsty; Hatfield, Wesley; Kaiser, Peter; and Lathrop, Richard, "Predicting Positive p53 Cancer Rescue Regions Using Most Informative Positive (MIP) Active Learning", *PLoS Computational Biology*, vol. 5, Issue 9 (2009).
Ding, Chris; Peng, Hanchuan, "Minimum Redundancy Feature Selection from Microarray Gene Expression Data", *2nd IEEE Computer Society Bioinformatics Conference (CSB 2003)*, Aug. 11-14, 2003, Stanfor, CA, USA pp. 523-529.
Efron, Bradley; Hastie, Trevor; Johnstone, Iain; and Tibshirani, Robert, "Least Angle Regression", Jan. 2003.
Forman, George, "BNS Feature Scaling: An Improved Representation over TF-IDF for SVM Text Classification", ACM 17th Conference on Information and Knowledge Management 2008.
Friedman, Jerome, "Greedy Function Approximation: A Gradient Boosting Machine", IMS 1999 Reitz Lecture, modified 2001.
Gretton, Arthur; Bousquet, Olivier; Smola, Alex; and Schölkopf, "Measuring Statistical Dependence with Hilbert-Schmidt Norms", ALT 2005, LNAI 3734 (2005), 63-77.

(Continued)

*Primary Examiner* — Lut Wong
(74) *Attorney, Agent, or Firm* — Berkeley Law & Technology Group, LLP

(57) ABSTRACT

A novel method and/or system of feature selection is described.

20 Claims, 7 Drawing Sheets

(56) References Cited

OTHER PUBLICATIONS

Guyon, Isabelle; Elisseeff, André, "An Introduction to Variable and Feature Selection", *Journal of Machine Learning Research* 3 (2003), 1157-1182.

Huang, Jian; Horowitz, Joel; and Wei, Fengrong, "Variable Selection in Nonparametric Additive Models", *The Annals of Statistics*, vol. 38, No. 4, (2010), 2282-2313.

Liu, Han; Lafferty, John; and Wasserman, Larry, "Nonparametric Regression and Classification with Joint Sparsity Constraints" (2008), *Computer Science Department*. Paper 1034. http://repository.cmu.edu/compsci/1034.

Masaeli, Mahdokht; Fung, Glenn; and Dy, Jennifer, "From Transformation-Based Dimensionality Reductin to Feature Selection", *Proceedings of the 27th International Conference on Machine Learning*, Haifa, Israel, 2010.

Mørup, Morten; Madsen, Kristoffer Hougaard; and Hansen, Lars Kai, "Approximate L0 constrained Non-negative Matrix and Tensor Factorization", *IEEE International Symposium on Circuits and Systems* 2008, ISCAS 2008.

Peng, Hanchuan; Long, Fuhui; and Ding, Chris, "Feature Selection Based on Mutual Information: Criteria of Max-Dependency, Max-Relevance, and Min-Redundancy", *IEEE Transactions on Pattern Analysis and Machine Intelligence*, vol. 27, No. 8 (2005), 1226-1228.

Raskutti, Garvesh; Wainwright, Martin; and yu, Bin, "Minimax-Optimal Rates for Sparse Additive Models Over Kernel Classes Via Convex Programming", *Journal of Machine Learning Research* 13 (1012), 389-427.

Ravikumar, Pradeep; Lafferty, John; Liu, Han; and Wasserman, Larry, "Sparse Additive Models", 2008.

Rodriguez-Lujan, Irene; Huerta, Ramon; Elkan, Charles; and Cruz, Carlos Santa, "Quadratic Programming Feature Selection", *Journal of Machine Learning Research* 11 (2010), 1491-1516.

Roth, Volker, "The Generalized LASSO", *IEEE Transactions on Neural Networks*, vol. 15, No. 1 (2004), 16-28.

Scheetz, Todd; et al., "Regulation of gene expression in the mammalian eye and its relevance to eye disease", *PNAS* vol. 103, No. 39 (2006), 14429-14434.

Shenoy, Pradeep; Miller, Kai; Crawford, Beau; and Rao, Rajesh P. N., "Online Electromyographic Control of a Robotic Prosthesis", *IEEE Transactions on Biomedical Engineering*, vol. 55, No. 3 (2008), 1128-1135.

Song, Le; Smola, Alex; Gretton, Arthur; Bedo, Justin; and Borgwardt, Karsten, "Feature Selection via Dependence Maximization", *Journal of Machine Learning Research* 13 (2012), 1393-1434.

Steinwart, Ingo, "On the Influence of the Kernal on the Consistency of Support Vector Machines", *Journal of Machine Learning Research* 2 (2001), 67-93.

Suzuki, Taiji; Sugiyama, Masashi, "Fast Learning Rate of Multiple Kernel Learning: Trade-Off between Sparsity and Smoothness", *Proceedings of the 15th Conference on Artificial Intelligence and Statistics (AISTAATS)* 2012, canary Islands, vol. 22 of JMLR: W&CP 22.

Suzuki, Taiji; Sugiyama, Masashi; Kanamori, Takafumi; and Sese, Jun, "Mutual Information Estimation Reveals Global Associations between Stimuli and Biological Processes", *BMC Bioinformatics* 2009, 10(Suppl 1).

Tibshirani, Robert, "Regression Shrinkage and Selection via the Lasso", *Journal of the Royal Statistical Society, Series B (Methodological)*, vol. 58, Issue 1 (1996), 267-288.

Xing, Eric; Jordan, Michael; and Karp, Richard, "Feature Selection for High-Dimensional Genomic Microarray Data", *Proceedings of the 18th International Conference on Machine Learning*, (2001).

Yamada, Makoto; Jitkrittum, Wittawat; Sigal, Leonid; Xing, Eric; and Sugiyama, Masashi, "High-Dimensional Feature Selection by Feature-Wise Kernelized Lasso", *Massachusettes Institute of Technology*, published online Dec. 4, 2013.

Yamada, Makoto; Sugiyama, Masashi; and Matsui, Tomoko, "Semi-supervised Speaker Identification under Covariate Shift", *Signal Processing*, vol. 90, No. 8 (2010).

Zhao, Zheng; Wang, Lei; and Liu, Huan, "Efficient Spectral Feature Selection with Minimum Redundancy", *Association for the Advancement of Artificial Intelligence* (2010).

\* cited by examiner

FIG. 3

| Type | | Features (d) | Samples (n) |
|---|---|---|---|
| Small & High (Classification) | AR10P | 2400 | 130 |
| | PIE10P | 2400 | 210 |
| | PIX10P | 10000 | 100 |
| | ORL10P | 10000 | 100 |
| | TOX | 5748 | 171 |
| | CLL-SUB | 11340 | 111 |
| Small & High (Regression) | TRIM32 | 31098 | 120 |
| Large & High (Classification) | p53 | 5408 | 31420 |

FIG. 5

|        | N³LARS      | HSIC Lasso  | SpAM        | mRMR        | QPFS (MI)   | QPFS (HSIC) | FOHSIC      |
|--------|-------------|-------------|-------------|-------------|-------------|-------------|-------------|
| AR10P  | .154 (.016) | .196 (.028) | .255 (.036) | .268 (.038) | .217 (.050) | .235 (.034) | .350 (.091) |
| PIE10P | .124 (.010) | .135 (.014) | .250 (.042) | .225 (.036) | .183 (.026) | .155 (.021) | .285 (.059) |
| PIX10P | .171 (.020) | .177 (.023) | .388 (.105) | .200 (.066) | .286 (.057) | .198 (.036) | .348 (.064) |
| ORL10P | .182 (.022) | .192 (.026) | .300 (.047) | .294 (.095) | .204 (.032) | .191 (.034) | .225 (.045) |
| TOX    | .397 (.029) | .382 (.027) | .394 (.028) | .386 (.032) | .384 (.028) | .371 (.040) | .396 (.036) |
| CLL-SUB| .349 (.039) | .344 (.034) | .403 (.058) | .328 (.039) | .322 (.033) | .281 (.050) | .352 (.064) |

FEATURE SELECTION

BACKGROUND

1. Field

The present disclosure relates generally to feature selection, such as with respect to an application of machine learning.

2. Information

Various techniques for machine learning and/or for feature selection are well-known; however, such techniques have various assumptions and, thus, may not be appropriate for some situations. For example, Least Absolute Shrinkage and Selection Operator (Lasso) is limited to linear objectives. Instance-wise non-linear Lasso, although not limited to linear objectives, due to being instance-wise, would not be employable for feature selection since comparisons of features are desired to do feature selection. Hilbert-Schmidt Independence Criterion Lasso (HSIC Lasso) permits use of a non-linear objective (e.g., non-linear relationship between input and output signal samples) but is computationally expensive (e.g., complex) to implement. Therefore, in situations involving significant amounts of signal samples to be processed, it may be less effective. Thus, an approach to feature selection that is able to in effect process large sample sets with a non-linear objective may be desirable.

BRIEF DESCRIPTION OF DRAWINGS

Claimed subject matter is particularly pointed and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

FIG. 3 is a table summary of ACU signal sample sets.

FIG. 5. Is a table of mean redundancy rate for a variety of feature selection approaches, including an example embodiment approach, with respect to the signal sample sets of FIG. 3.

Figure 1:
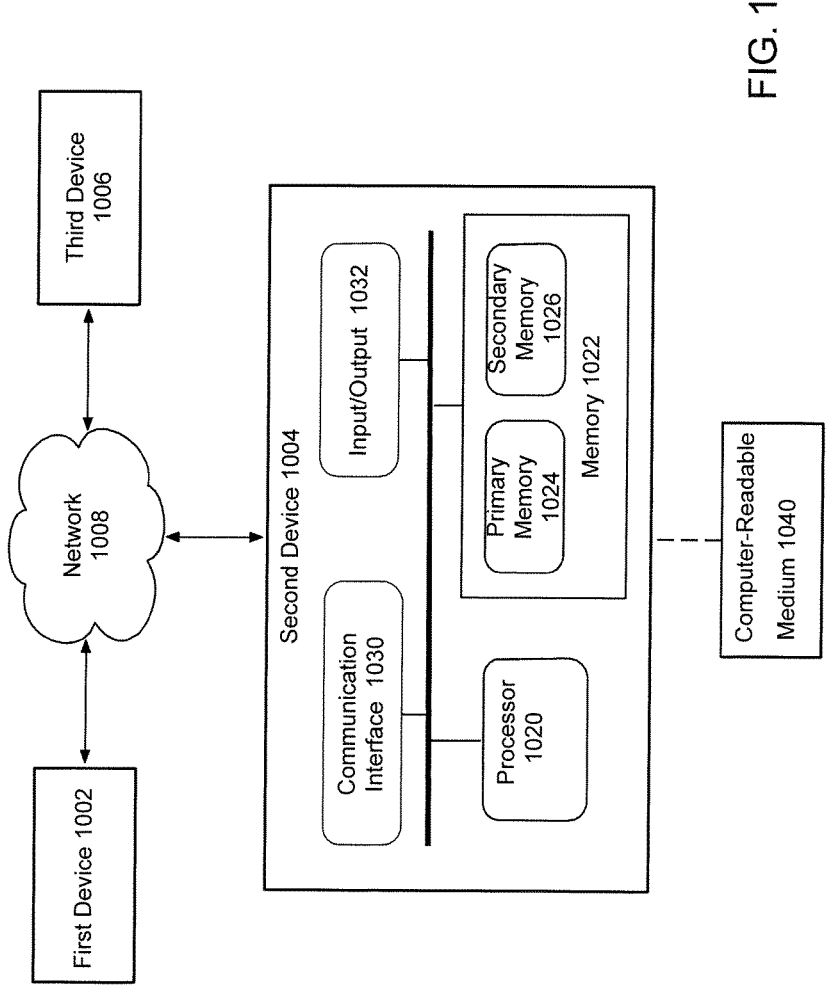
FIG. 1 is a schematic diagram of an embodiment of a network including example embodiments of computing devices.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which apportions of a computational problem may be allocated among computing devices, including one or more clients and one or more servers, via a computing and/or communications network, for example.

A network may comprise two or more network devices and/or may couple network devices so that signal communications, such as in the form of signal packets and/or frames, for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computer and/or machine readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network refers to a portion and/or part of a network. Sub-networks may also comprise links, such as physical links, connecting and/or coupling nodes to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting network communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate noes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known and/or later developed. The Internet includes local area networks (LANs), wide area networks (WANs), wireless networks, and/or long haul public networks that, for example, may allow signal packets and/or frames to be communicated between LANs. The term world wide web (WWW or web) and/or similar terms may also be used, although it refers to a sub-portion of the Internet that complies with the Hypertext Transfer Protocol or HTTP. For example, network devices may engage in an HTTP session through an exchange of Internet signal packets and/or frames. It is noted that there are several versions of the Hypertext Transfer Protocol. Here, the term Hypertext Transfer Protocol or HTTP is intended to refer to any version, now known and/or later developed. It is likewise noted that in various places in this document substitution of the term Internet with the term world wide web may be made without a significant departure in meaning and may, therefore, not be inappropriate in that the statement would remain correct with such a substitution.

Although claimed subject matter is not in particular limited in scope to the Internet or to the web, it may without limitation provide a useful example of an embodiment for purposes of illustration. As indicated, the Internet may comprise a worldwide system of interoperable networks, including devices within those networks. The Internet has evolved to a public, self-sustaining facility that may be accessible to tens of millions of people or more worldwide. Also, in an embodiment, and as mentioned above, the terms "WWW" and/or "web" refer to a sub-portion of the Internet that complies with the Hypertext Transfer Protocol or HTTP. The web, therefore, in this context, may comprise an Internet service that organizes stored content, such as, for example, text, images, video, etc., through the use of hypermedia, for example. A HyperText Markup Language ("HTML"), for example, may be utilized to specify content and/or format of hypermedia type content, such as in the form of a file or an "electronic document," such as a web page, for example. An Extensible Markup Language ("XML") may also be utilized to specify content and/or format of hypermedia type content, such as in the form of a file or an "electronic document," such as a web page, in an embodiment. Of course, HTML and XML are merely example languages provided as illustrations and, furthermore, HTML and/or XML is intended to refer to any version, now known and/or later developed. Likewise, claimed subject matter is not intended to be limited to examples provided as illustrations, of course.

The term "web site" and/or similar terms refer to a collection of related web pages, in an embodiment. The term "web page" and/or similar terms relates to any electronic file and/or electronic document, such as may be accessible via a network, by specifying a uniform resource locator (URL) for accessibility via the web, in an example embodiment. As alluded to above, a web page may comprise content coded using one or more languages, such as, for example, HTML and/or XML, in one or more embodiments. Although claimed subject matter is not limited in scope in this respect. Also, in one or more embodiments, developers may write code in the form of JavaScript, for example, to provide content to populate one or more templates, such as for an application. Here, JavaScript is intended to refer to any now known or future versions. However, JavaScript is merely an example programming language. As was mentioned, claimed subject matter is not limited to examples or illustrations.

Terms including "entry", "electronic entry", "document", "electronic document", "content", "digital content", "item", and/or similar terms are meant to refer to signals and/or states in a format, such as a digital format, that is perceivable by a user, such as if displayed and/or otherwise played by a device, such as a digital device, including, for example, a computing device. In an embodiment, "content" may comprise one or more signals and/or states to represent physical measurements generated by sensors, for example. For one or more embodiments, an electronic document may comprise a web page coded in a markup language, such as, for example, HTML (hypertext markup language). In another embodiment, an electronic document may comprise a portion and/or a region of a web page. However, claimed subject matter is not limited in these respects. Also, for one or more embodiments, an electronic document and/or electronic entry may comprise a number of components. Components in one or more embodiments may comprise text, for example as may be displayed on a web page. Also for one or more embodiments, components may comprise a graphical object, such as, for example, an image, such as a digital image, and/or sub-objects, such as attributes thereof. In an embodiment, digital content may comprise, for example, digital images, digital audio, digital video, and/or other types of electronic documents.

Signal packets and/or frames, also referred to as signal packet transmissions and/or signal frame transmissions, and may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path comprising a portion of the Internet, from a site via an access node coupled to the Internet. Likewise, a signal packet and/or frame may be forwarded via network nodes to a target site coupled to a local network, for example. A signal packet and/or frame communicated via the Internet, for example, may be routed via a path comprising one or more gateways, servers, etc. that may, for example, route a signal packet and/or frame in accordance with a target and/or destination address and availability of a network path of network nodes to the target and/or destination address. Although the Internet comprises a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer model. Although physically connecting a network via a hardware bridge is done, a hardware bridge may not, by itself, typically include a capability of interoperability via higher level layers of a network protocol. A network protocol refers to a set of signaling conventions for computing and/or communications between and/or among devices in a network, typically network devices; for example, devices that substantially comply with the protocol and/or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance and/or substantial compatibility.

Typically, a network protocol, such as protocols characterized substantially in accordance with the aforementioned OSI model, has several layers. These layers may be referred to here as a network stack. Various types of network transmissions may occur across various layers. A lowest level layer in a network stack, such as the so-called physical layer, may characterize how symbols (e.g., bits and/or bytes) are transmitted as one or more signals over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are compatible and/or compliant with a particular network protocol at these higher-level layers. Therefore, for example, a hardware bridge, by itself, may be unable to forward signal packets to a destination device since transmission of signal packets characterized at a higher-layer of a network stack may not be supported by a hardware bridge. Although higher-level layers of a network protocol may, for example, affect device permissions, user permissions, etc., a hardware bridge, for example, may typically provide little user control, such as for higher-level layer operations.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, for example, in some situations. A network may be very large, such as comprising thousands of nodes, millions of nodes, billions of nodes, or more, as examples.

Media networks, such as the Yahoo™ network, for example, may be increasingly seeking ways to attract users to their networks and/or to retain users within their networks for extended periods of time. A media network may, for example, comprise an Internet website and/or group of websites having one or more sections. For instance, the Yahoo!™ network includes websites located within different categorized sections, such as sports, finance, current events, and games, to name just a few non-limiting examples among a variety of possible examples. To attract and/or retain users within its network, Yahoo!™ and/or other media networks may continually strive to provide content relating to categorized sections that may be interesting and/or of use to users.

As more users remain within a media network for extended periods of time, a media network may become more valuable to potential advertisers. Thus, typically, advertisers may be inclined to pay more money and/or provide other considerations to a media network in return for advertising to users, for example, via that media network, its partners, and/or subsidiaries. In an implementation, if a user displays a page, perhaps as a result of utilizing a search engine, such as via a server, as an example, located within or external to a processing and/or communications infrastructure of a media network, may deliver relevant content, which may include, for example, textual and/or multimedia content that may entice users to remain within the media network for a relatively extended period of time.

As a non-limiting example, responsive to submitting a search query (e.g., terms that may be submitted to a search engine) for example, and/or as a result of any other type of interaction with a client computing platform, for example, such as via a browser, a user may access one or more pages (e.g., web pages), for example. Search query results and/or query suggestions that may be beneficial to a user in conducting further search operations may be delivered to a client computing device, such as for presentation to a user, by way of a display device coupled to a client computing device. Search results and/or search query suggestions, for example, may be arranged, at least in some instances, in decreasing order of relevance, such as may be determined and/or estimated by search query processing operations. Presentation of search results, such as in decreasing order of relevance (e.g., more relevant search results displayed near a top portion of a search results page), as a non-limiting example, may permit a user of a client computing device to more efficiently access one or more electronically stored documents, for example, that may be reasonably pertinent to a submitted search query.

As used herein, "electronic document", "electronically stored document," and or similar terms (such as may be returned from a search engine, including as a hyperlink, for example, as a response to submittal of a search query) refers to any type of human- and/or device-readable content in the form of electronic signals and/or physical states, such as memory states. For example, a human readable electronic document may comprise content, such as magazine, journal, and/or newspaper articles, accessible from storage, such as online and/or network storage, including a local network, for example. As one non-limiting example, written content may be stored using and/or as a Portable Document Format (PDF), just to name an example. An electronic document, such as one with text, may likewise comprise one or more portions of an audio file; one or more portions of a video file such as a still image, a video "clip," and so forth. An electronic document may also comprise stored device-readable materials, such as UPC codes, QR codes, and/or other materials comprising symbols that may not be easily understood by a human. It should be noted that claimed subject matter is intended to embrace all types of electronic documents, which may be represented using arrangements of binary digital signals capable of storage using transformations of physical states, such as memory states, for example.

In some embodiments, a large corpus of content, such as electronic documents, which may number in the hundreds of millions, billions, or may be virtually without limitation, may be stored across a vast network of devices, including memory devices capable of being accessed by computing and/or network devices, for example. In such a network, which may be referred to as a "distributed system" (e.g., a Hadoop distributed computing system), a processing node may represent a single device or a cluster of computing, network and/or storage devices, although claimed subject matter is not limited in scope in this respect. Processing nodes may be organized into processing clusters and/or processing groups comprising any number of individual devices, such as a single computing and/or networking device, a collection of several computing and/or network devices, or perhaps many hundreds, thousands, or greater number of individual computing and/or network devices. Claimed subject matter is intended to embrace the vast variety of possible distributed computing and/or network arrangements.

In this context, a Map-Reduce type architecture refers to implementation for processing and/or generating large sets of signal samples with a parallel, distributed process over a network of individual computing devices. A map operation performs processing to generate a key-value pair and distributes those pairs to servers and a reduce operation performs a summary operation (such as counting the number of students in each queue, yielding name frequencies). A system may employ such an architecture for processing by marshalling distributed servers, running various tasks in parallel, managing communications and signal transfers between various parts of the system, in an embodiment. One non-limiting but well-known example is the Hadoop distributed computing system. It refers to an open source implementation of a map-reduce type architecture, but may include other aspects, such as the Hadoop distributed file system (HDFS). In general, Hadoop refers to an implementation scheduler for executing large processing jobs using a map-reduce architecture.

Also as used herein, one or more parameters may be descriptive of a collection of signal samples, such as one or more electronic documents, and exist in the form of physical signals and/or states, such as memory states. For example, one or more parameters referring to an electronic document comprising a photographic image may include parameters, such as time of day at which a photographic image was taken, latitude and longitude of an image capture device, such as a camera, for example, etc. In another example, one or more parameters relevant to content comprising a technical article may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

In one or more embodiments, responsive to receipt of a query from a client device, for example, a service may be utilized to provide logical paths for parameters, such as a universal resource locator (URL), as an example, which may enable a client device to access content, such as electronic documents, for example, and/or portions thereof. A path for a parameter, such as a logical path, may refer to a logical path for a component of a specific network resource of a host computing and/or storage device at which electronic documents may be stored and/or otherwise made accessible, such as particular memory locations, for example. According to some embodiments, parameters for content, also referred to as content related parameters, may be made accessible along with providing other additional services.

Feature selection may comprise a technique employed by a media network in a variety of ways. As simply one example, a media network may be interested in features that appear to be more effective for attracting users to their website or websites. Likewise, feature selection may be useful for customers of a media network, e.g., advertisers, to determine features that are more effective in generating views and/or purchases from users. Of course, claimed subject matter is not limited in the foregoing respects. Various types of other applications exist, such as gene selection, document categorization, and prosthesis control, to name a few.

However, to engage in feature selection using online content may involve processing significant amounts of content in the form of stored signal samples, typically. As previously described, various techniques for machine learning and/or for feature selection are well-known; however, such techniques have various assumptions and, thus, may not be appropriate for some situations. In this context, the term feature and/or similar terms refer to properties in the physical world that are capable of being quantified in the form of a physical signal and/or a physical state, such as a state of a memory. Thus, features may comprise the number of users that access a web page, the time at which a web page is accessed, the locations of users accessing a particular web page. Other examples may comprise the amplitude of a dominant frequency in a frequency spectrum, the wavelength of the dominant frequency, etc.

Continuing with examples of techniques of feature selection, for example, Least Absolute Shrinkage and Selection Operator (Lasso) employs linear objectives and, thus, is unable to accommodate non-linearity. Instance-wise non-linear Lasso, although not limited to linear objectives, due to being instance-wise, would not be employable for feature selection since comparisons of features are desired to do feature selection. Hilbert-Schmidt Independence Criterion Lasso (HSIC Lasso) permits use of a non-linear objective (e.g., is able to accommodate a non-linear relationship between input and output signal samples) but is computationally expensive (e.g., complex) to implement. Therefore, in situations involving significant amounts of content (e.g., in the form of signal samples to be processed), it may be less effective. Thus, an approach to feature selection that is able to process large sample sets and handle non-linearity, for example, may be desirable.

For example, some situations may involve a few hundred features and a couple hundred million signal samples or even more. Typically, feature 'engineering' may attempt to improve performance, e.g., identify a set of substantially non-redundant features that may be dominant in producing particular results, referred to here as output signals. As a simple non-limiting example, improved feature selection may be more enticing to more users and, thus, potentially may generate more page views, more click through, more online purchases, etc.

Feature engineering may involve creating a feature by addition/subtraction/division/multiplication from two or more other features. However, with many possible combinations for creating features, feature engineering is time consuming. Moreover, typically this may provide a local improvement for a portion of the set of signal samples rather than global improvement (e.g., improvement over an entire set of signal samples processed). Local improvement is generally less advantageous than global improvement.

In an example embodiment to produce a technique to process large amounts of signal samples and handle non-linearity, features may be generated by combining two or more other features and adding the generated features (in the form of signal samples associated with the generated features) to an initial set of signal samples. In an embodiment, features may then be selected via a feature selection method able to more efficiently and/or more effectively process signal samples, including a large sample set, and handle non-linearity.

There are several technical challenges, however, to doing so. For example, as a result of adding features, a high-dimensional computational burden may be present (e.g., $d>10^4$, where d represents dimensionality). Further, as was alluded to, a linear method, such as a linear support vector machine (SVM), for example, may not perform well. A non-linear relation may better capture a relationship between input and output signal samples than a linear one. Likewise, signal samples to be processed may be dense. In this context, the term dense refers to many features having non-zero-values. If many features have zero values, it is referred to as sparse. If the dimensionality is low, Gradient Boosted Decision Trees (GBDT) might be used. However, if dimensionality is large, as for an illustrative example situation, Gradient Boosted Decision Trees (GBDT) may not an appropriate method due to computational complexity if signal samples are also dense. It is noted that feature selection for a large set of signal samples also having high-dimensionality is not well studied, in particular for a signal sample set involving a relationship between input and output signal samples that is potentially non-linear and dense.

In an illustrative embodiment, however, to at least partially address at least some of the foregoing technical issues, a feature selection method to identify substantially non-redundant features may be employed. Thus, in an illustrative embodiment, an approach may be suitable in situations, such as involving a large and high-dimensionality set of signal samples to be processed, such as more than ten thousand signal samples and more than 500 dimensions, for example. Furthermore, nonlinearity may be accommodated in this illustrative example and this illustration demonstrates scalability regarding the number of samples and dimensionality, as discussed herein. In this document, it is noted that the expression N³LARS is used to refer to one or more illustrative embodiments. Of course, claimed subject matter is not limited in scope to illustrative embodiments, such as the foregoing.

Specifically, however, continuing with an example, a nonlinear extension of least-angle regression (LARS), referred to as N³LARS for an embodiment, may be employed in which similarity between input signal samples and output signal samples may be quantified, such as in this example, by using a normalized variant of HSIC (e.g., Normalized HSIC or NHSIC). Moreover, an embodiment may employ a distributed computation approach, such as via a map-reduce type architecture, one non-limiting example being a Hadoop distributed computing system.

Another aspect of an illustrative example may include a convex objective. Consequently, in such situations, for example, improvement may be global rather than local for a set of signal samples to be processed, which is typically desirable.

Likewise, incremental improvement in efficiency and/or effectiveness over the state of the art may result for a situation involving processing of a large signal set with high-dimensionality. For example, in an embodiment, 100 features may be identified in a couple of hours with state of the art computing devices, from a set of signal samples in which d is 5000 and n is over 26000, despite potentially significant computational complexity.

In an embodiment, a HSIC Lasso formulation may be re-formulated using least-angle regression (LARS) and in which similarity between input and output signal samples may be measured through a normalized variant of HSIC. Likewise, in an embodiment, a distributed computation approach may be employed, such as via a map-reduce architecture (e.g., a Hadoop distributed computing system).

As mentioned, feature selection comprises a known and popular artificial intelligence problem, and there are a variety of existing methods, as alluded to previously. Feature selection methods can be mainly categorized into two classes: Wrapper and Filter methods. See Guyon, I. and Elisseeff, A. (2003). An introduction to variable and feature selection. *Journal of Machine Learning Research (JMLR)*, 3, 1157-1182. Here, in an embodiment, a filter-type feature selection approach is provided, as mentioned, to find a substantially non-redundant feature set from a large n and high-dimensionality d in non-linear manner. It is believed that existing approaches do not adequately address such situations, for reasons previously described.

Let $X=[x_1; \ldots ; x_n]=[u_1; \ldots ; u_d]^T$, which is an element of $R^{d \times n}$, denote input signal samples, $y=[y_1; \ldots ; y_n]$, which is an element of $R^n$, denote output signal samples. Suppose n independent and identically distributed (i.i.d.) paired samples $(x_i; y_i)$ are drawn from a joint distribution with density $p(x; y)$. Note, Y, the domain of the output signals or signal samples could be either continuous (e.g., regression) or categorical (e.g., classification). Assume x comprises a dense vector of signals (e.g., signal samples). The goal of supervised feature selection is to identify m features (m<d) of input signal vector x that are responsible for predicting output signal vector y.

In an embodiment, for a large and high-dimensionality feature selection situation, a nonlinear extension of the non-negative least angle regression (LARS), which in some embodiments may include kernel transformation, may be employed (e.g., N³LARS). See Efron, B., Hastie, T., Johnstone, I., and Tibshirani, R. (2004). Least angle regression. *The Annals of statistics*, 32(2), 407-499; and see Morup, M., Madsen, K. H., and Hansen, L. K. (2008). Approximate I 0 constrained non-negative matrix and tensor factorization. In *ISCAS* 2008. IEEE. Furthermore, a distributed computing approach may permit scaling up, as appropriate and/or applicable. It is well known that non-negative Lasso (a.k.a, positive Lasso) may be employed for non-negative LARS (NN-LARS). See Efron, B., Hastie, T., Johnstone, I., and Tibshirani, R. (2004). Least angle regression. *The Annals of statistics*, 32(2), 407-499; and see Morup, M., Madsen, K. H., and Hansen, L. K. (2008). Approximate I 0 constrained non-negative matrix and tensor factorization. In *ISCAS* 2008. IEEE. That is, a formulation in terms of HSIC Lasso may also be reformulated in terms of NN-LARS and NN-LARS and, thus, may provide a process for reaching a meaningful result. Note, in NN-LARS, it is assumed that input and output signal samples have mean 0 and unit length variance, where K denotes input signal vectors (e.g., signal samples) and L denotes output signal vectors (e.g., signal samples). For an embodiment, normalization may be implemented as follows:

$\bar{K}=K/K_{Fro}$, $\bar{L}=L/L_{Fro}$ such that $1^T\bar{K}1_n=0$, $1^T\bar{L}1_n=0$, an $\|\bar{K}_{Fro}\|^2=1$, and
$\|\bar{L}_{Fro}\|^2=1$.

In an embodiment of N³LARS, a formulation may be written as:

$$\min_{\alpha \in R^d} \left\| \bar{L} - \sum_{k=1}^{d} \alpha_k \bar{K}^{(k)} \right\|_{Frob}^2 + \lambda \|\alpha\|_1,$$

s.t. $\alpha_1, \ldots, \alpha_d \geq 0$.

where $\alpha=[\alpha_1, \ldots, \alpha_d]^1$ is a coefficient vector, $\alpha_k$ is the regression coefficient of the k-th feature, $\|\cdot\|_1$ and $\|\cdot\|_2$ are the $l_1$- and $l_2$-norms, Moreover, in an embodiment, an objective function of N³LARS may be re-written, see Cortes, C., Mohri, M., and Rostamizadeh, A. (2012). Algorithms for learning kernels based on centered align-ment. Journal of Machine Learning Research (JMLR), 13,795-828, as $$C - 2\sum_{k=1}^{d} \alpha_k NHSIC(u_k, y) + \sum_{k,l=1}^{d} \alpha_k, \alpha_l NHSIC(u_k, u_l),$$

where NHSIC $(u, y)=tr(\tilde{K}\tilde{L})$ is the normalized version of HSIC (a.k.a., the centered kernel target alignment and C=NHSIC(y,y).

An aspect of a least angle regression (LARS) type formulation, as illustrated above, includes a capability to identify m features with m operations, in comparison with 'tuning' a regularization parameter to obtain m features in HSIC Lasso. For high-dimensionality and small sample sets, it is reasonable to run HSIC Lasso several times to obtain m features by tuning. However, for high-dimensionality and large sample sets, tuning a regularization parameter may not be desirable as too time consuming. In addition, a 'regularization path' is in effect generated for an amount of computational complexity roughly equivalent to ordinary least squares (e.g., via LARS). Moreover, LARS is not difficult to implement.

Below, a sample embodiment in pseudo code form is summarized. Let A be the indices of an active set and I the indices of an inactive set. An embodiment of a process for N3LARS is provided in which:

$\alpha_A \in \mathbb{R}^{|A|}$, $1 \in \mathbb{R}^{|A|}$ is a vector of all ones, $[Q_A]_{i,j}$=NHSIC $(u_{A,i}, u_{A,j})$, and $u_{A,i}$ is a feature signal sample vector selected at the i-th operation.

```
Initialize: α = 0 and A = [ ].
while |A| < m do
    /* Select m features */
    for k = 1 ... d do
        /* compute negative gradient */
```
$$\hat{c}_k = \text{NHSIC}(u_k, y) - \sum_{i=1}^{d} \alpha_i \text{NHSIC}(u_k, u_i)$$
```
    end for
    Find feature index: j = argmax_{c_l} ĉ_k > 0.
    Update sets: A = [A j], I = I\j
    Update coefficients:
        α_A = α_A + μ̂Q_A^{-1} 1,
```
$$\hat{\mu} = \min_{\mu} \begin{cases} \exists I \in \text{I:} \tilde{c}_I = \tilde{c}_A \\ \tilde{c}_A = 0 \end{cases},$$
```
end while
```

Note that NHSIC in the pseudo-code above takes a non-negative value, and is zero if and only if two random variables are statistically independent (with use of a universal reproducing kernel such as the Gaussian kernel; see Steinwart, I. (2001). On the influence of the kernel on the consistency of support vector machines. *Journal of Machine Learning Research (JMLR)*, 2, 67-93). If the k-th feature $u_k$ has high dependence on output signal vector y, NHSIC($u_k$, y) becomes a large value and, thus, $\alpha_k$ should also be large. On the other hand, if $u_k$ and y are independent, NHSIC($u_k$, y) is close to zero; so that $u_k$ tends to not be selected by the l1-regularizer. Furthermore, if $u_k$ and $u_l$ are strongly dependent (e.g., substantially or partially redundant features), NHSIC($u_k$,$u_l$) is large and thus, $\alpha_k$ and/or $\alpha_l$ tends to be zero. That is, substantially non-redundant features that have measurable dependence on output signal vector y tend to be selected. To summarize, since the NHSIC score is zero if and only if two random variables are independent, it follows that substantially non-redundant features may be selected.

Additional features may be identified and selected by iterating, as indicated above. Note that computationally "expensive" (e.g., complex) operations for an illustrative embodiment, as provided above, involves computation of Gram matrices, such as $$\tilde{K}^{(k)} \text{ and } \sum_{i=1}^{d} \alpha_i N\hat{H}SIC(u_k, u_i).$$

More specifically, n×n dimensional Gram matrices are to be computed for all features d. Thus, computational complexity is $O(dn^3)$ (the computational complexity of NHSIC ($u_k$,$u_i$) is $O(n^3)$). Although we are able to limit computing NHSIC values that are non-zero and are able to re-use NHSIC values computed at previous iterations, even with these ways to limit computational burden or expense, it may be a challenge to compute even one iteration for d and n being large. Thus, in one potential embodiment, a distributed computing approach and use of the Nystrom approximation may be employed. See Scḧolkopf, B. and Smola, A. J. (2002). *Learning with Kernels*. MIT Press, Cambridge, Mass. Thus, in one embodiment, computational complexity of NHSIC may be reduced with use of the Nystrom approximation method. For example, kernels may be introduced here as provided below.

A universal kernel, such as the Gaussian kernel, may be employed to potentially permit NHSIC to detect dependence between two random variables. See Gretton, A., Bousquet, O., Smola, A., and Scho̅lkopf, B. (2005). Measuring statistical dependence with Hilbert-Schmidt norms. In ALT. Springer. Moreover, the delta kernel is useful for multi-class classification. See Song, L., Smola, A., Gretton, A., Bedo, J., and Borgwardt, K. (2012). Feature selection via dependence maximization. *The Journal of Machine Learning Research (JMLR)*, 13, 1393-1434.

Thus, in one embodiment, the Gaussian kernel may be used for input signal vector, x. For output signal vector, y, in an embodiment, the Gaussian kernel may be used for regression cases and the delta kernel for classification cases. To employ these Kernel types, input signal vectors x, in this example embodiment, are normalized to have unit standard deviation. The Gaussian kernel may be used as follows, in an embodiment, K(x, x')=

$$\exp\left(-\frac{(x-x')^2}{2\sigma_x^2}\right)$$

where $\sigma_x$ is the Gaussian kernel width. In regression cases (e.g., $y \in R$), in an embodiment, output signal vectors y may also be normalized to have unit standard deviation. The Gaussian kernel may be used in an embodiment as follows $$L(y, y') = \exp\left(-\frac{(y-y')^2}{2\sigma_y^2}\right)$$

where $\sigma_y$ is the Gaussian kernel width.

Again, for normalization, in an embodiment, $\sigma^2_x$=1 and $\sigma^2_y$=1 may be employed. In classification cases (e.g., y is categorical), likewise, for an embodiment, the delta kernel for y, may be used as follows $$L(y, y') = \begin{cases} 1/n_y & \text{if } y = y', \\ 0 & \text{otherwise,} \end{cases}$$

where $n_y$ is the number of samples in class y.

To reduce the computational cost of generating Gram matrices, the Nystrom approximation for NHSIC may be used in an embodiment as follows NHSIC$(u, y)$=tr$((F^T G)^2)$, where $F = \Gamma K_{nb} K_{bb}^{-1/2} / (\text{tr}((K_{n,b} K_{bb}^{-1/2})^2))^{1/4}$, $R_{nb} \in \mathbb{R}^{a \times b}$, $K_{bb} \in \mathbb{R}^{b \times b}$, $G = \Gamma L_{nb} L_{bb}^{-1/2} / (\text{tr}((L_{nb} L_{bb}^{-1/2})^2))^{3/4}$, $L_{nb} \in \mathbb{R}^{n \times b}$, $L_{bb} \in \mathbb{R}^{b \times b}$, and be is the number of basic function.

Likewise, in this example illustration, $u_b$=[-5-4.47, ... , 4.47, 5.0]$^T \in \mathbb{R}^{20}$, where $b$=20<<$n$.

For the output signal matrix G in regression, the above technique to approximate the Gram matrix may be employed as an approximation. For classification, G may be computed (e.g., approximated) as $$G_{k,j} = \begin{cases} \frac{1}{\sqrt{n_k}} & (k = y_j) \\ 0 & (\text{otherwise}) \end{cases}$$

where $G \in \mathbb{R}^{C \times n}$.

As indicated, computational complexity of NHSIC for regression is $O(nb^2)$ and classification is $O((\min(C, b))^2 n)$. While the Nystrom approximation may be useful for large n, as suggested, for high-dimensionality cases (e.g., d is also large), the computation 'cost' may still be large.

However, $c_k$ for different values of k may be computed separately as a result of statistical independence. Thus, $c_k$ may be computed in parallel with a distributed computing approach, such as in an Hadoop computing architecture, for an embodiment, as described below.

In general, for a map-reduce type distributed computing architecture, an approach may comprise the following.

Initially, compute output signal matrix G (and store). Below $u_k$ represents feature signal vectors over the values of k for the set of feature vector signal samples.

In a distributed fashion, compute $F_k$, NHSIC($u_k$,y), previously specified, over the values k for the set of feature signal vector for non-zero $\alpha_k$.

In a distributed fashion, compute NHSIC($u_k$, $u_j$), for non-zero $\alpha_k$ and non-zero $\alpha_j$. In a distributed fashion, NHSIC($u_k$, $u_j$), for non-zero $\alpha_k$ (for all j). The foregoing permits computation of the negative gradient, as provided earlier, over k.

Thus, an initial feature may be selected substantially in accordance with the gradient.

The selected feature may, after identification, be removed from the set of signal samples (e.g., signal samples associated with the selected feature). New $\alpha_p$ for p over the values of p may be computed, where p has one less feature than k. Likewise, distributed computing over the remaining set of features may be repeated to determine the next feature, as above for the initial feature, but with a reduced set of feature signal vectors and reduced set of signal samples.

The foregoing selection, removal, and determination may be repeated again multiple times until a set of m features is selected.

Below is a pseudo-code embodiment of the approach described immediately above.

---

Preparation: Compute G and store it to "output" file.

Step1, Map-I: For each feature vector $u_k$, we compute $F_k$, NHSIC($u_k$, y), and output a key-value pair < k, NHSIC($u_k$, y), $F_k \in \mathbb{R}^{n \times b}$ >.
Step2, Map-Reduce-D Map. From < k, NHSIC($u_k$, y). $F_k \in \mathbb{R}$ HU n/b >, we find maximum values in each mapper and then find a maximum NHSIC score at a reducer.
Step3, Map-II: With given < j = argmax($c_j$), $F_j$ >, we compute NHSIC($u_k$, $u_j$) and output a key-value pair < k, NHISC($u_k$, $u_j$) >.
Step4, Reduce-I: With given < k, NHSIC($u_k$, $u_j$) > and < -1, NHSIC($u_k$, y) >, we update $\alpha$.
Step5, Map-Reduce-II: With given < k, NHSIC($u_k$, $u_j$) >, < -1, NHSIC($u_k$, y) >, and $\alpha^{new}$, we compute c.

---

Figure 7:
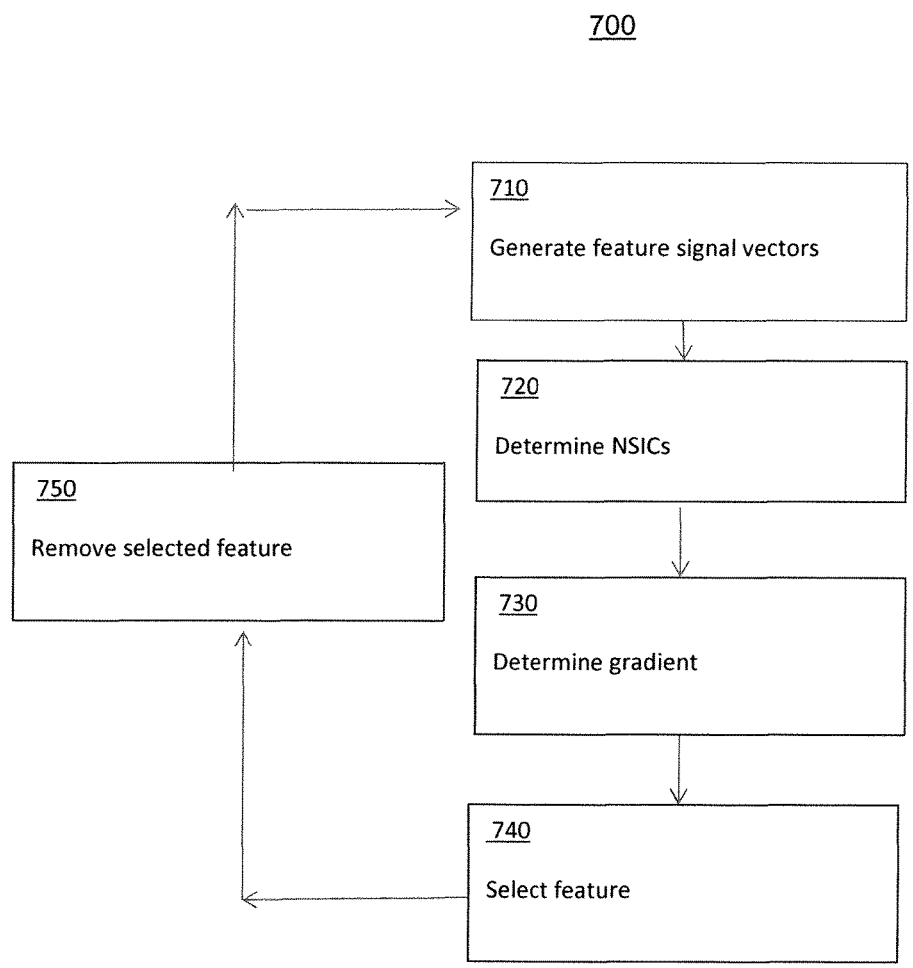
FIG. 7 is a flowchart of an embodiment.

FIG. 7 is a flowchart of an example embodiment. Thus, in one illustrative embodiment, a method of feature selection may comprise the following. At block 710, a set of feature signal vectors for a set of features may be generated from a set of signal samples in which a respective signal vector in the set of feature signal vectors corresponds to a respective feature in the set of features. As also shown, at block 720, the following for the respective feature signal vectors in the set of feature signal vectors may be determined: a normalized version of Hilbert-Schmidt Independence between a respective feature signal vector of the set of feature signal vectors and an output signal array, and a normalized version of Hilbert-Schmidt Independence between the respective feature signal vector of the set of feature signal vectors and the remaining feature signal vectors of the set of feature signal vectors. At block 730, a gradient per feature of the set of features is determined using the previously computed normalized versions of Hilbert-Schmidt Independence for the set of feature signal vectors. A feature having the feature signal vector of the set of feature signal vectors that produces the largest gradient may then be selected at block 740.

Following selection of an initial feature, at block 750, the selected feature may be removed. In particular, signal samples associated with the selected feature may be removed from the set of signal samples and an updated set of feature signal vectors may be generated. Likewise, regression coefficients $\alpha_i$ are recomputed. As shown, by looping back to block 710, feature signal vectors may be updated as well. Thus, at block 720, the following for the respective feature signal vectors in the set of updated feature signal vectors may be determined: a normalized version of Hilbert-Schmidt Independence between a respective feature signal vector of the set of updated feature signal vectors and an output signal array, and a normalized version of Hilbert-Schmidt Independence between the respective feature signal vector of the set of updated feature signal vectors and the remaining feature signal vectors of the set of updated feature signal vectors. At block 730, a gradient per feature of the set of features is likewise determined using the previously computed normalized versions of Hilbert-Schmidt Independence for the set of updated feature signal vectors. Again, a feature having the feature signal vector of the updated set of feature signal vectors that produces the largest gradient may be selected at 750.

Thus, removing, determining and selecting may be repeated until a particular number of features are selected. Depending at least partially upon particulars regarding application, at least some of the selected features may comprise demographic features, image-related features, and/or text-related features, as examples.

In order to implement an embodiment employing the Nystrom approximation and to employ distributed computing, such as previously described, for example, at block 720, $F_k$, NHSIC($u_k$,y), previously specified, may be computed in parallel via separate mappers over the values k for the set of feature signal vector for non-zero $\alpha_k$. Likewise, at a reducer, a maximum value may be determined. In a similar manner, again at block 720, NHSIC($u_k$, $u_j$), may be computed in parallel for non-zero $\alpha_k$ (for all j) over a network of separate mappers. At block 730, the computed values may be reduced to compute the gradient and consequently at block 740 select an initial feature, for example. Likewise, at block 750, having identified the selected feature, $\alpha_i$ may be updated in parallel over a network of reducers.

An example embodiment, such as those previously described, for example, may be evaluated using synthetic and actual high-dimensionality signal sample sets. For example, signal samples may be generated according to the following expression:

$Y = X1 * \exp(X2) + X3 + 0.1 * E,$ where $(X_1, \ldots, X_{1000})^T \sim N(O_{1000}, I_{1000})$, $X_{1001} = X_1 + 0.01 * E, \ldots, X_{2000} = X1000 + 0.01 * E$, and $E \sim N(0,1)$. Note, $X_4, \ldots, X_{1000}$ and $X_{1004}, \ldots, X_{2000}$ are irrelevant features, and $X_{1001}, X_{1002}$, and $X_{1003}$ are redundant features of $X_1$, $X_2$, and $X_3$. Here, $N(\mu, \Sigma)$ denotes the multi-variate Gaussian distribution with mean $\mu$ and covariance matrix $\Sigma$.

Figure 2:
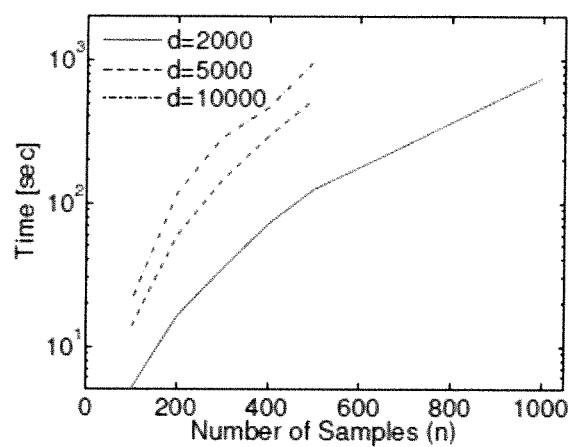
FIG. 2 is a plot of computational time against number of samples as a function of dimensionality for a non-distributed illustrative embodiment.

FIG. 2 shows the computational time for an example embodiment not employing either distributed computing or the Nystrom approximation on a Xeon 2.4 GHz (16 cores) with 24 GB memory. As shown, computational cost increases with growth in number of samples, suggesting that over 1000 features becomes impractical if not unfeasible. However, an embodiment in which distributed computing and the Nystrom approximation is employed is able to extract 100 features from a sample set with d=5000 and n=26120 in a few hours.

For a classification experiment, signal sample sets available at http://featureselection.asu.edu/datasets.php (e.g. Arizona State University (ASU)) were employed. FIG. 3 contains a summary table. For the sets of signal samples, 80% were used for training and the rest for testing. Classification experiments were run 100 times by randomly selecting training and test samples and reporting the average classification accuracy. Since the sets are multi-class, multi-class kernel logistic regression (KLR) was used. See Hastie, T., Tibshirani, R., and Friedman, J. (2001). *The Elements of Statistical Learning: Data Mining, Inference, and Prediction*. Springer, N.Y.; and see Yamada, M., Sugiyama, M., and Matsui, T. (2010). Semi-supervised speaker identification under covariate shift. *Signal Processing*, 90(8), 2353-2361.

For KLR, a Gaussian kernel was used. Kernel width and regularization parameter were chosen based at least in part on a 3-fold cross-validation. For these experiments, 50 features were selected by feature selection methods and also selected using the top m=10, 20, . . . , 50 features having the largest absolute regression coefficients. To assess whether an example embodiment selects substantially and/or at least partially non-redundant features appropriately, a redundancy rate (RED), as follows, was used, $$RED = \frac{1}{m(m-1)} \sum_{u_k, u_l, k > 1} |\rho_{k,l}|$$

where $\rho_{k,l}$ is a correlation coefficient between k-th and l-th features, as described in Zhao, Z., Wang, L., and Li, H. (2010). Efficient spectral feature selection with minimum redundancy. In *AAAI*.

A large RED score means that selected features are correlated to each other, that is, at least partially and/or substantially redundant features are selected. The RED score of the example embodiment used tended to be smaller than those of existing feature selection methods, suggesting improvement.

Figure 4:
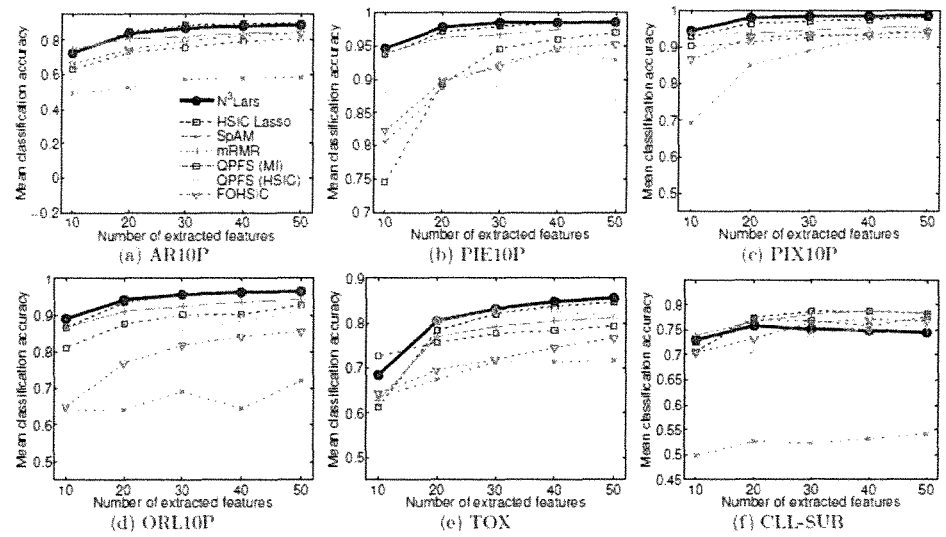
FIG. 4 illustrates plots of mean classification accuracy for a variety of feature selection approaches, including an example embodiment approach, with respect to the signal sample sets of FIG. 3.

FIG. 4 shows plots (a)-(f) illustrating the average classification accuracy over 100 runs, where the x-axis is the number of selected features. As illustrated, the example embodiment used compares favorably with other existing feature selection approaches, including HSIC Lasso, a state-of-the-art high-dimensionality feature selection method.

FIG. 5 shows the averaged RED values over the top m=10, 20, . . . , 50 features selected by the various feature selection methods. The RED score of the example embodiment used tends to be smaller than those of existing feature selection methods, suggesting a capability to select substantially and/or at least partially non-redundant features.

An example embodiment was also evaluated for a large and high-dimensionality set of signal samples taken from Danziger, S. A., Baronio, R., Ho, L., Hall, L., Salmon, K., Hatfield, G. W., Kaiser, P., and Lathrop, R. H. (2009). Predicting positive p53 cancer rescue regions using most informative positive (mip) active learning. *PLoS computational biology*, 5(9), e1000498, which has 5408 features and 31420 samples, referred to here as "p53." Here, problem application involves predicting transcriptional activities (e.g., active or inactive) where class labels are determined via in vivo assays. Note that, the signal sample set is dense.

Figure 6:
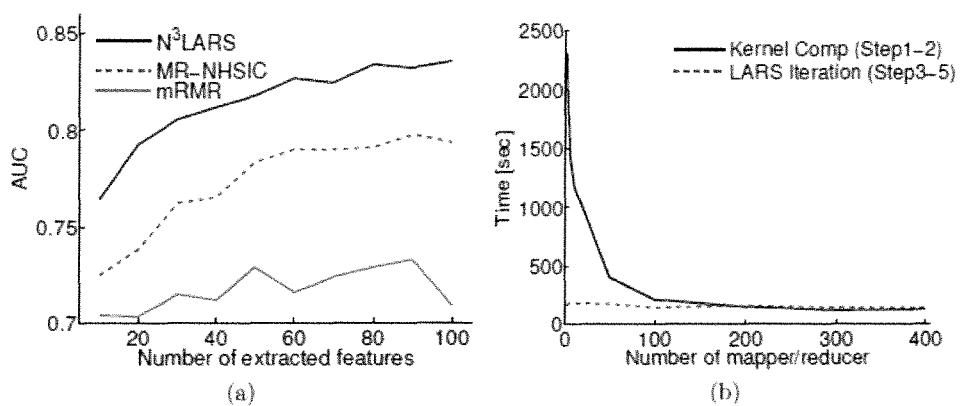
FIG. 6 illustrates plots comparing a variety of feature selection approaches, including an example embodiment approach.

In this experiment, a gradient boosting decision tree (GBDT) method was used as a classifier with 100 trees of 20 nodes. Here, 100 features were selected using feature selection methods and also using the top m=10, 20, . . . , 100 features having the largest absolute regression coefficients, similar to previously. Since the set of samples is large, comparisons are limited to an example embodiment with NHSIC based maximum relevance (MR-NHSIC) and mRMR. Plot (a) in FIG. 6 shows AUC (area under the curve) scores of an ROC (receiver operating characteristics) curve for an embodiment, MR-NHSIC, and mRMR, respectively. Overall, existing feature selection methods were outperformed. Plot (b) in FIG. 6 shows computational time with respect to the number of mappers/reducers, where the number of mappers/reducers were changed as 1, 5, 10, 50, 100, 200, 300, and 400. The solid black line indicates computation time for $F_k$ and G. The dotted line indicates computation time for an iteration, as described above, for determining NHSIC. As illustrated, computational time for $F_k$ and G noticeably decreases as the number of mappers/reducers increases. On the other hand, computational "cost" for an iteration grows slightly as the number of mappers/reducers decreases. This may be because the dimensionality of the p53 signal sample set is not excessively high.

For purposes of illustration, FIG. 1 is an illustration of an embodiment of a system 100 that may be employed in a client-server type interaction, such as described infra., such as a network device and/or a computing device, for example. As one example, FIG. 1 may illustrate a portion of a distributed computing system. In addition or as an alternative, FIG. 1 may illustrate an example for use in connection with rendering a GUI via a device, such as a client, for communication with a server, for example. In FIG. 1, computing device 1002 ('first device' in figure) may interface with client 1004 ('second device' in figure), which may comprise features of a client computing device, for example. Communications interface 1030, processor (e.g., processing unit) 1020, and memory 1022, which may comprise primary memory 1024 and secondary memory 1026, may communicate by way of a communication bus, for example. In FIG. 1, client computing device 1002 may represent one or more sources of analog, uncompressed digital, lossless compressed digital, and/or lossy compressed digital formats for content of various types, such as video, imaging, text, audio, etc. in the form physical states and/or signals, for example. Client computing device 1002 may communicate with computing device 1004 by way of a connection, such as an internet connection, via network 1008, for example. Although computing device 1004 of FIG. 1 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 1020 may be representative of one or more circuits, such as digital circuits, to perform at least a portion of a computing procedure and/or process. By way of example, but not limitation, processor 1020 may comprise one or more processors, such as controllers, microprocessors, microcontrollers, application specific integrated circuits, digital signal processors, programmable logic devices, field programmable gate arrays, the like, or any combination thereof. In implementations, processor 1020 may perform signal processing to manipulate signals and/or states, to construct signals and/or states, etc., for example.

Memory 1022 may be representative of any storage mechanism. Memory 1020 may comprise, for example, primary memory 1022 and secondary memory 1026, additional memory circuits, mechanisms, or combinations thereof may be used. Memory 1020 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 1020 may be utilized to store a program. Memory 1020 may also comprise a memory controller for accessing computer readable-medium 1040 that may carry and/or make accessible content, which may include code, and/or instructions, for example, executable by processor 1020 and/or some other unit, such as a controller and/or processor, capable of executing instructions, for example.

Under direction of processor 1020, memory, such as memory cells storing physical states, representing, for example, a program, may be executed by processor 1020 and generated signals may be transmitted via the Internet, for example. Processor 1020 may also receive digitally-encoded signals from client computing device 1002.

Network 1008 may comprise one or more network communication links, processes, services, applications and/or resources to support exchanging communication signals between a client computing device, such as 1002, and computing device 1006 ('third device' in figure), which may, for example, comprise one or more servers (not shown). By way of example, but not limitation, network 1008 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 1004, as depicted in FIG. 1, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 1022 may store cookies relating to one or more users and may also comprise a computer-readable medium that may carry and/or make accessible content, including code and/or instructions, for example, executable by processor 1020 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11 b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11 b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers.

In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method for a filter-type feature selection for on-line content using a map reduce-type computing network, the method comprising:
   executing computer instructions on at least one processor of at least one computing device that includes at least one memory, the computer instructions having been stored in the at least one memory, the computer instructions comprising:
   generating, with the at least one processor, from a set of signal samples a set of feature signal vectors for a set of features for the on-line content in which a respective signal vector in the set of feature signal vectors corresponds to a respective feature in the set of features;
   determining at least the following for the respective feature signal vectors in the set of feature signal vectors:
      a normalized version of Hilbert-Schmidt Independence between a respective feature signal vector of the set of feature signal vectors and an output signal array,
      a normalized version of Hilbert-Schmidt Independence between the respective feature signal vector of the set of feature signal vectors and the remaining feature signal vectors of the set of feature signal vectors, and
      a gradient per feature of the set of features for the on-line content using the previously determined normalized versions of Hilbert-Schmidt Independence for the set of feature signal vectors;
   selecting a feature having the feature signal vector of the set of feature signal vectors that produces the largest gradient;
   storing the selected feature in the at least one memory; and
   comparing, via accessing the at least one memory with the at least one processor and on a feature-by-feature basis, feature similarity between particular content on a media network coupled to the at least one computing device and the on-line content to determine a set of non-redundant features for the particular content based, at least in part, on the selected feature.

2. The method of claim 1, and further comprising:
   removing the signal samples from the set of signal samples and the feature signal vector from the set of feature signal vectors associated with the selected feature to produce an updated set of feature signal vectors;
   determining the following for the respective feature signal vectors in the set of updated feature signal vectors:
      a normalized version of Hilbert-Schmidt Independence between a respective feature signal vector of the set of updated feature signal vectors and an output signal array,
      a normalized version of Hilbert-Schmidt Independence between the respective feature signal vector of the set of updated feature signal vectors and the remaining feature signal vectors of the set of updated feature signal vectors, and
      a gradient per feature of the set of features using the previously determined normalized versions of Hilbert-Schmidt Independence for the set of updated feature signal vectors;
   selecting a feature having the feature signal vector of the updated set of feature signal vectors that produces the largest gradient; and
   repeating the removing, determining and selecting until a particular number of features are selected.

3. The method of claim 1, wherein the gradient is computed in accordance with a least-angle regression (LARS) process.

4. The method of claim 1, wherein the determining comprises using the Nystrom approximation to determine a normalized version of Hilbert-Schmidt Independence between a respective feature signal vector of the set of updated feature signal vectors and an output signal array, and to determine a normalized version of Hilbert-Schmidt Independence between the respective feature signal vector of the set of updated feature signal vectors and the remaining feature signal vectors of the set of updated feature signal vectors.

5. The method of claim 4, wherein the determining the normalized version of Hilbert-Schmidt Independence and the determining the gradient is computed in a distributed computing manner.

6. The method of claim 2, wherein the determining comprises using the Nystrom approximation to determine a normalized version of Hilbert-Schmidt Independence between a respective feature signal vector of the set of updated feature signal vectors and an output signal array, and to determine a normalized version of Hilbert-Schmidt Independence between the respective feature signal vector of the set of updated feature signal vectors and the remaining feature signal vectors of the set of updated feature signal vectors.

7. The method of claim 6, wherein the determining the normalized version of Hilbert-Schmidt Independence and the determining the gradient is computed in a distributed computing manner.

8. The method of claim 7, wherein the method is executed on a distributed computing architecture system.

9. The method of 1, wherein the feature selected comprises a non-redundant feature.

10. The method of claim 9, wherein the size of the signal sample set exceeds 20,000 samples.

11. The method of claim 10, wherein the dimensionality of the signal sample set exceeds 1000.

12. The method of claim 11, wherein the number of features selected exceeds 50.

13. The method of claim 11, wherein the signal sample set comprises a signal sample set of features having non-zero-values.

14. A system for a filter-type feature selection for on-line content using a map reduce-type computing network, the system comprising:

a computing platform comprising at least one computing device
including at least one processor and at least one memory;
the at least one computing device to execute computer instructions on the at least one processor;
the computer instructions to be executed to have been stored on the at least one memory for execution on the at least one processor, the computer instructions comprise instructions to:
generate from a set of signal samples a set of feature signal vectors for a set of features for the on-line content in which a respective signal vector in the set of feature signal vectors corresponds to a respective feature in the set of features;
determine at least the following for the respective feature signal vectors in the set of feature signal vectors:
a normalized version of Hilbert-Schmidt Independence between a respective feature signal vector of the set of feature signal vectors and an output signal array,
a normalized version of Hilbert-Schmidt Independence between the respective feature signal vector of the set of feature signal vectors and the remaining feature signal vectors of the set of feature signal vectors, and
a gradient per feature of the set of features for the on-line content to be determined with the previously determined normalized versions of Hilbert-Schmidt Independence for the set of feature signal vectors; and
select a feature having the feature signal vector of the set of feature signal vectors to produce the largest gradient;
store the selected feature in the at least one memory; and
compare, via an access to the at least one memory with the at least one processor and on a feature-by-feature basis, feature similarity between particular content on a media network coupled to the at least one computing device and the on-line content to determine a set of non-redundant features for the particular content based, at least in part, on the selected feature.

15. The system of claim 14, wherein the computer instructions further to:
remove the signal samples from the set of signal samples and the feature signal vector from the set of feature signal vectors associated with the selected feature to produce an updated set of feature signal vectors;
determine the following for the respective feature signal vectors in the set of updated feature signal vectors:
a normalized version of Hilbert-Schmidt Independence between a respective feature signal vector of the set of updated feature signal vectors and an output signal array,
a normalized version of Hilbert-Schmidt Independence between the respective feature signal vector of the set of updated feature signal vectors and the remaining feature signal vectors of the set of updated feature signal vectors, and
a gradient per feature of the set of features to be determined with the previously determined normalized versions of Hilbert-Schmidt Independence for the set of updated feature signal vectors; and
select a feature having the feature signal vector of the updated set of feature signal vectors to produce the largest gradient.

16. The system of claim 15, wherein the computer instructions further to again remove, determine and select one or more additional times until a particular number of features is reached.

17. The system of claim 14, wherein the system comprises a distributed computing network, wherein the computing platform comprises more than one computing device in the distributed computing network, and wherein the more than one computing devices in the distributed computing network are to determine for the respective feature signal vectors in the set of feature signal vectors in a distributed computing fashion.

18. A system for a filter-type feature selection for on-line content using a map reduce-type computing network, the system comprising:
means for generating, with the at least one processor, from a set of signal samples a set of feature signal vectors for a set of features for the on-line content in which a respective signal vector in the set of feature signal vectors corresponds to a respective feature in the set of features;
means for determining at least the following for the respective feature signal vectors in the set of feature signal vectors:
a normalized version of Hilbert-Schmidt Independence between a respective feature signal vector of the set of feature signal vectors and an output signal array,
a normalized version of Hilbert-Schmidt Independence between the respective feature signal vector of the set of feature signal vectors and the remaining feature signal vectors of the set of feature signal vectors, and
a gradient per feature of the set of features for the on-line content using the previously determined normalized versions of Hilbert-Schmidt Independence for the set of feature signal vectors;
means for selecting a feature having the feature signal vector of the set of feature signal vectors that produces the largest gradient;
means for storing the selected feature in at least one memory; and
means for comparing, via accessing the at least one memory with the at least one processor and on a feature-by-feature basis, feature similarity between particular content on a media network coupled to the at least one computing device and the on-line content to determine a set of non-redundant features for the particular content based, at least in part, on the selected feature.

19. The system of claim 18, and further comprising:
means for removing the signal samples and feature signal vector associated with the selected feature to produce an updated set of feature signal vectors;
means for determining the following for the respective feature signal vectors in the set of updated feature signal vectors:
a normalized version of Hilbert-Schmidt Independence between a respective feature signal vector of the set of updated feature signal vectors and an output signal array,
a normalized version of Hilbert-Schmidt Independence between the respective feature signal vector of the set of updated feature signal vectors and the remaining feature signal vectors of the set of updated feature signal vectors, and
a gradient per feature of the set of features using the previously determined normalized versions of Hilbert-Schmidt Independence for the set of updated feature signal vectors; and means for selecting a feature having the feature signal vector of the updated set of feature signal vectors that produces the largest gradient.

20. The system of claim 19, and further comprising means for repeating removing, determining and selecting until a particular number of features are selected.

* * * * *